(12) United States Patent
Cahill et al.

(10) Patent No.: US 7,224,392 B2
(45) Date of Patent: May 29, 2007

(54) ELECTRONIC IMAGING SYSTEM HAVING A SENSOR FOR CORRECTING PERSPECTIVE PROJECTION DISTORTION

(75) Inventors: Nathan D. Cahill, Rochester, NY (US); Andrew C. Gallagher, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 603 days.

(21) Appl. No.: 10/052,020

(22) Filed: Jan. 17, 2002

(65) Prior Publication Data

US 2004/0201768 A1 Oct. 14, 2004

(51) Int. Cl.
*H04N 5/335* (2006.01)
*H04N 5/225* (2006.01)
*H04N 7/00* (2006.01)

(52) U.S. Cl. ............... 348/315; 348/36; 348/340
(58) Field of Classification Search ............ 348/311, 348/315, 335, 36–39, 374, 42
See application file for complete search history.

(56) References Cited

U.S. PATENT DOCUMENTS

| | | | | |
|---|---|---|---|---|
| 3,971,065 A | | 7/1976 | Bayer ............... 358/41 |
| 4,554,585 A | * | 11/1985 | Carlson ............ 348/342 |
| 4,602,289 A | | 7/1986 | Sekine ............. 358/213 |
| 5,489,940 A | | 2/1996 | Richardson et al. ...... 348/315 |
| 5,739,852 A | | 4/1998 | Richardson et al. ...... 348/315 |
| 5,739,940 A | | 4/1998 | Kondo ............. 359/204 |
| 6,201,574 B1 | | 3/2001 | Martin ............. 348/315 |
| 6,603,503 B1 | * | 8/2003 | Ribera et al. ........ 348/48 |
| 6,738,057 B1 | * | 5/2004 | Campbell .......... 345/611 |
| 6,798,923 B1 | * | 9/2004 | Hsieh et al. ........ 382/284 |

OTHER PUBLICATIONS

"Panoramic Stereo Imaging System with Automatic Disparity Warping and Seaming" H.-C. Huang and Y.-P. Hung. Graphical Models and Image Processing, vol. 60, No. 3, May 1998, pp. 196-208.*
Polar Coordinate System. The Penguin Dictionary of Mathematics (1998). Retrieved Sep. 28, 2005. Available from xreferplus. http://www.xreferplus.com/entry/144128.*
Spherical Coordinate System. The Penguin Dictionary of Mathematics (1998). Retrieved Sep. 28, 2005. Available from xreferplus. http://www.xreferplus.com/entry/1441659.*

(Continued)

*Primary Examiner*—Ngoc-Yen Vu
*Assistant Examiner*—Carramah J. Quiett
(74) *Attorney, Agent, or Firm*—Robert L. Walker

(57) ABSTRACT

An electronic imaging system for capturing an image of a scene includes an optical system for producing an optical image of the scene, an imaging sensor having a surface in optical communication with the optical system, and a plurality of imaging elements distributed on the surface of the imaging sensor according to a distribution representable by a nonlinear function in which the relative density of the distributed imaging elements is greater toward the center of the sensor. Such a distribution provides physical coordinates for the imaging elements corresponding to a projection of the scene onto a non-planar surface, thereby compensating for perspective distortion of the scene onto the non-planar surface and alleviating the need to perform geometric warping of the images after they have been captured.

21 Claims, 5 Drawing Sheets

OTHER PUBLICATIONS

Cylindrical Coordinate System. The Penguin Dictionary of Mathematics (1998). Retrieved Sep. 28, 2005. Available from xreferplus. http://www.xreferplus.com/entry/1439544.*

Dictionary of Mathematical Terms, 2nd Edition, D. Downing, Barron's Hauppauge, New York, (1995), p. 247.

Digital Image Processing, 5th Edition, B. Jahne, Springer, Berlin, 2002, p. 190.

Practical Digital Image Processing, R. Lewis, Ellis Horwood, New York, 1990, p. 252.

The Focal Encyclopedia of Photography, 3rd Edition, L. Strobel and R. Zakia, Focal Press, Boston, 1993, p. 59.

Digital Image Processing, 2nd nd Edition, R. Gonzalez, and R. Woods, Prentice Hall, Upper Saddle River, New Jersey, 2002, p. 62.

* cited by examiner

ELECTRONIC IMAGING SYSTEM HAVING A SENSOR FOR CORRECTING PERSPECTIVE PROJECTION DISTORTION

FIELD OF THE INVENTION

The present invention relates generally to imaging systems and, in particular, to an imaging system for capturing non-planar projections of a scene.

BACKGROUND OF THE INVENTION

Conventional cameras provide photographs of real world scenes with a limited field of view of the scene being photographed. In many scenarios, the photographer desires an image corresponding to a wider field of view. Typically, the photographer can resort to two methods of generating a wide field of view image. The first method is to capture the wide field of view image directly; e.g., with a wide-angle lens, or with a specialized system of mirrors to reflect the wide field of view onto the sensor. The second method is to capture a collection of images, each image having a narrower field of view, and then use one of a variety of digital image stitching techniques to combine the narrow field of view images into a composite digital image. The composite digital image will appear to be a single wide field of view image.

When a camera captures an image of a scene, the image represents a perspective projection of the scene onto the planar sensor. Inherent to perspective projection is a natural distortion, namely, objects closer to the center of the image appear smaller than similar objects near the edges of the image. This distortion becomes immediately apparent when attempting to stitch subsequent images together. Therefore, typical image stitching systems include a step of warping the images to compensate for this perspective distortion. In a physical sense, the perspective distortion would not exist if the sensor were not planar, but rather spherical (with the radius of the sphere depending on the focal length of the lens). In scenarios where the sequence of images to be stitched is captured by rotating a camera on a tripod (or rotating a camera about a vertical axis), the perspective distortion would not exist in the horizontal direction if the sensor were cylindrical (with the radius of the cylinder depending on the focal length of the lens, and the axis of the cylinder lying on the axis of rotation of the camera). Even though there would still be distortion in the vertical direction of the images, this distortion would not hamper the photographer's ability to seamlessly stitch together such a sequence of images.

Since it is extremely difficult and expensive to manufacture sensors that are spherical or cylindrical in shape, compensation for the perspective distortion is generally performed after the image has been captured. The compensation is performed by geometrically warping the image so that it appears to have been captured on the spherical or cylindrical sensor. In the article "Panoramic Stereo Imaging System with Automatic Disparity Warping and Seaming" by H.-C. Huang and Y.-P. Hung (Graphical Models and Image Processing, Vol. 60, No. 3, May, 1998, pp. 196–208), the authors derive the equations relating pixels of a cylindrical sensor to that of a planar sensor. The derivation of the equations relating pixels of a spherical sensor to that of a planar sensor is similar. For the spherical sensor, the pixel (x,y) of the compensated image $\tilde{I}$ is related to the captured image I by the relationship:

$$\tilde{I}(x,y) = I(f \tan(xp_xf^{-1})/p_x, f \tan(yp_yf^{-1})/p_y),$$

where $p_x$ and $p_y$ are the horizontal and vertical pixel sizes, respectively, f is the focal length, and (x,y)=(0,0) corresponds to the center of the image. For the cylindrical sensor, the pixel (x,y) of the compensated image $\tilde{I}$ is related to the captured image I by the relationship:

$$\tilde{I}(x,y) = I(f \tan(xp_xf^{-1})/p_x, yf\tan(xp_xf^{-1})/xp_x), \text{ for } x \neq 0,$$

and $$\tilde{I}(0,y) = I(0,y).$$

After each image in the sequence has been geometrically warped, typical image stitching systems then determine the parameters that optimally align the set of images (for example, by cross correlation or phase correlation, or by knowledge of the geometry of the camera at each capture position). Once the images are aligned, they are blended together (by taking weighted averages of overlapping pixels, for example) to form a composite digital image. Finally, depending on the choice of output, the composite digital image can be again geometrically warped, this time to simulate a perspective projection of the wide field of view scene onto a chosen reference planar sensor.

In some image stitching systems, specifically systems that construct composite digital images in real time, or systems that construct a large sequence of composite digital images (e.g., a system that stitches together images from video sequences to form a composite video sequence), the step of geometrically warping the images to compensate for the perspective distortion requires a significantly large portion of the total computational time of the system. Therefore, any mechanism that would alleviate the need to perform geometric warping of the images would remove this bottleneck in real-time or video image stitching systems.

Another type of distortion that occurs in most camera systems (especially those with wide-angle lenses) is lens distortion. Lens distortion frequently manifests itself as a radial distortion, where objects further from the center of the image appear smaller than those near the center of the image. In addition, lens irregularities and aberrations can induce local distortions in different areas of the image plane.

A method exists in the art to compensate for lens distortion without geometrically warping the images after they have been captured. U.S. Pat. No. 5,489,940, "Electronic Imaging System and Sensor for Correcting the Distortion in a Wide-Angle Lens", and U.S. Pat. No. 5,739,852, "Electronic Imaging System and Sensor for Use Therefor with a Nonlinear Distribution of Imaging Elements", both by C. Richardson and B. Stuckman, describe an imaging system comprising a sensor with a nonlinear distribution of sensor elements, wherein the distribution of the imaging elements corrects for the distortion in a wide angle lens. More specifically, the distribution of sensor elements has a relatively low density at a center point of the sensor surface and a relatively high density along the periphery of the sensor surface. However, neither of these patents are directly applicable to systems compensating for perspective distortion. Perspective distortion, as discussed previously, can be compensated for by projecting the image onto a nonplanar surface. Lens distortion, in the method of the two aforementioned patents, is compensated by projecting the image through a nonlinear function. This nonlinear function is selected such that the scene appears to be projected onto a planar surface, as expected by perspective projection. However, the relative densities of the distribution of sensor elements near the center and periphery of the image are inversely related to what the relative densities should be to compensate for perspective distortion. Consequently, when using digital stitching techniques to combine multiple images captured from the type of sensor disclosed in these patents, a geometric warping must still be applied to overcome the perspective projection.

Therefore, there exists a need in the art for an imaging system that would alleviate the need to perform geometric warping of images to compensate for perspective distortion after the images have been captured.

SUMMARY OF THE INVENTION

The present invention is directed to overcoming one or more of the problems set forth above. Briefly summarized, according to one aspect of the present invention, an electronic imaging system for capturing an image of a scene includes an optical system for producing an optical image of the scene, an imaging sensor having a surface in optical communication with the optical system, and a plurality of imaging elements distributed on the surface of the imaging sensor according to a distribution representable by a non-linear function in which the relative density of the distributed imaging elements is greater toward the center of the sensor. Such a distribution provides physical coordinates for the imaging elements corresponding to a projection of the scene onto a non-planar surface, thereby compensating for perspective distortion of the scene onto the non-planar surface and alleviating the need to perform geometric warping of the images after they have been captured.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems employing electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 1:
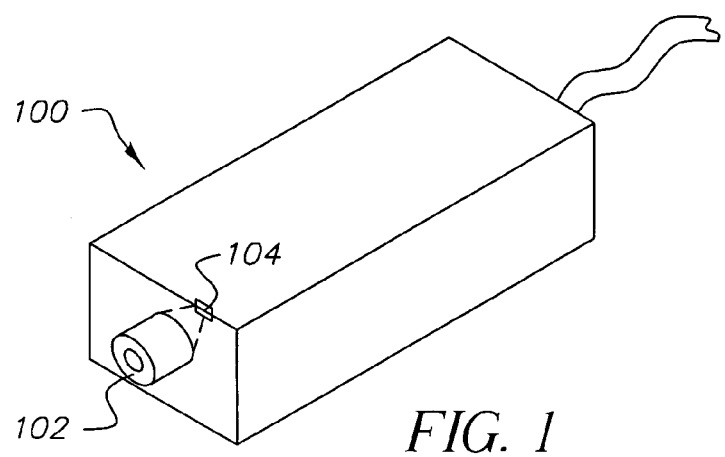
FIG. 1 shows a pictorial diagram of a camera used in conjunction with one embodiment of the present invention.

FIG. 1 shows a pictorial diagram of a camera used in conjunction with one embodiment of the present invention. Camera 100 includes an optical system, including a lens 102, that projects an image of the scene in front of camera 100 onto an imaging sensor 104. This sensor 104 includes an array of individual imaging elements which are nonlinearly distributed in such a fashion as to automatically correct for the distortion induced by a perspective projection.

Figure 2:
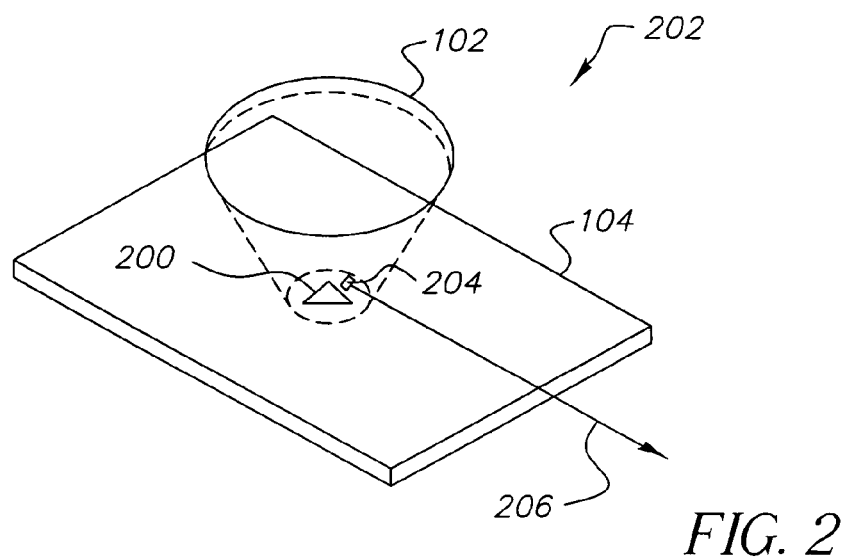
FIG. 2 presents a schematic representation of one embodiment of the present invention.

FIG. 2 presents a schematic representation of one embodiment of the present invention. The sensor 104 is provided for use in an electronic imaging system in which the lens 102 produces an optical image 200. This image is distorted by the perspective projection. The sensor includes a surface 202 in optical communication with the lens 102. The sensor further includes a plurality of imaging elements, such as imaging element 204, coupled to the surface for converting the optical image into a corresponding output signal on an output line 206. The plurality of imaging elements 204 has a distribution on the surface representable by a nonlinear function, wherein the distribution of the imaging elements simulates the projection of the image onto a nonplanar surface and thus corrects the perspective distortion in the image. Therefore, the output signal 206 corresponds to a perspective distortion corrected image.

Figure 3:
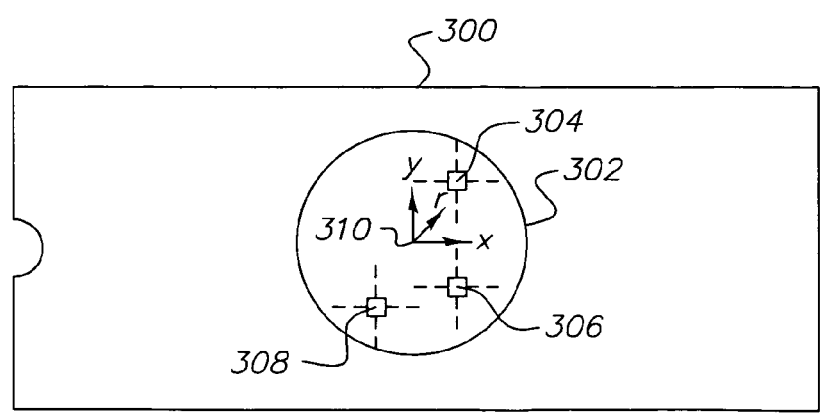
FIG. 3 shows a top view of an integrated circuit implementation of a sensor in accordance with one embodiment of the present invention.

FIG. 3 shows a top view of an integrated circuit implementation of the sensor 104 in accordance with one embodiment of the present invention. Chip body 300 includes a circular array 302 of imaging elements of which example elements 304, 306, and 308 are shown. One must appreciate that the circular array 302 can include thousands, even millions or more, of the imaging elements such as 304, 306 and 308, which, in a preferred embodiment are pixels of a charge-coupled device (CCD) or CMOS imager of the kind used in many applications as imaging sensors, particularly in electronic imaging systems. Note that the imaging elements may all have similar sensitivities to light, or the imaging elements may be sensitized to different portions of the visible spectrum, using color filter arrays such as described in U.S. Pat. No. 3,971,065. Axis 310 includes rectangular coordinate vectors x and y about an origin in the center of circular array 302.

In prior art sensors, these imaging elements are distributed uniformly about the surface of the integrated circuit on which they reside. Examples of prior art systems are described in U.S. Pat. No. 4,602,289, issued to Sekine, and in "a Device Structure and Spatial Spectrum for Checker-Pattern CCD Color Camera," IEEE Journal of Solid-State Circuits, Vol. SC13, No. 1, February 1978. In other prior art sensors, the distribution is nonlinear. Examples of such prior art systems are described in the aforementioned U.S. Pat. Nos. 5,489,940 and 5,739,852, issued to Richardson and Stuckman, and in U.S. Pat. No. 6,201,574, issued to Martin, which are incorporated herein by reference. (Like the other patents, Martin corrects for a wide angle field of view, in this case from a fisheye lens.) In the systems described in these patents, the nonlinear distribution of imaging elements corrects for lens distortion of a wide-angle lens. In particular, as described in the aforementioned U.S. Pat. Nos. 5,739,940, 5,489,940 and 6,201,574, the nonlinear distribution of imaging elements has a relatively low density at a center point of the surface and a relatively high density at a point along the periphery of the surface. The current invention differs from all of these systems in that the nonlinear distribution of imaging elements simulates the projection of the image onto a nonplanar surface and thus corrects for perspective distortion (and not only in systems with wide-angle lenses). Furthermore, this nonlinear distribution departs from the prior art in that it has a relatively high density at a center point of the surface and a relatively low density at a point along the periphery of the surface.

Figure 4:
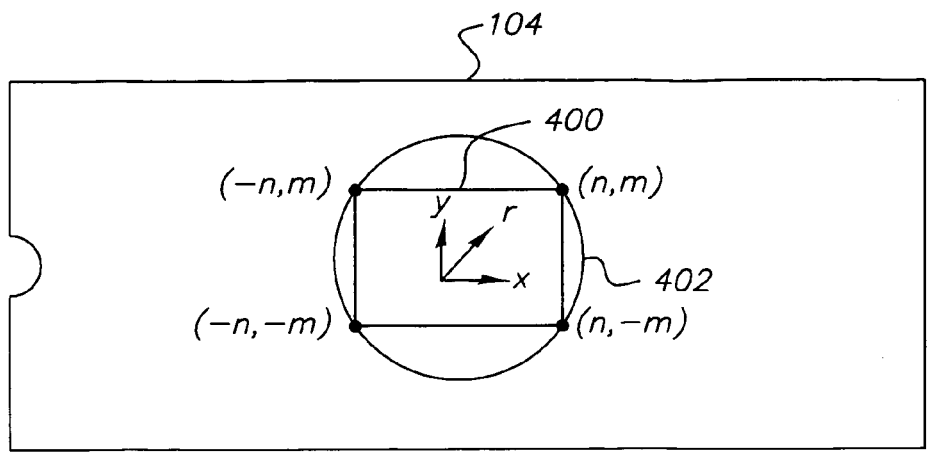
FIG. 4 shows a top view of an integrated circuit implementation of a sensor in accordance with an alternative embodiment of the present invention.

FIG. 4 shows a top view of an integrated circuit implementation of the sensor 104 in accordance with an alternative embodiment of the present invention. In this embodiment, the sensor 104 has a rectangular array 400 that generates a rectangular portion (400) of the image 402 produced by the lens 102. Each of the sensing elements 304, 306 and 308 has a unique two-dimensional address that allows the particular sensing element to be electronically accessed. The address of an arbitrary sensing element can be represented by the coordinate pair (a,b). The physical location on the sensor 104 of a sensing element 204 having an address (a,b) is given by (x,y) as follows:

$$x = R \cos((Ta/180)(n^2+m^2)^{-1/2}), \text{ and}$$

$$y = R \sin((Tb/180)(n^2+m^2)^{-1/2}),$$

where (n,m), (−n,m), (n,−m) and (−n,−m) are rectangular coordinates of the physical boundaries of the rectangular sensing array 400, R is the maximum radius of the two-dimensional array (where the origin is the center of the image 402), and T is the maximum angle captured by the lens (in degrees).

While the embodiments of the present invention present an addressing system whose origin is the center of the image, one of ordinary skill in the art will recognize that an arbitrary offset can be added to the address components in any dimension without loss of generality.

Figure 5:
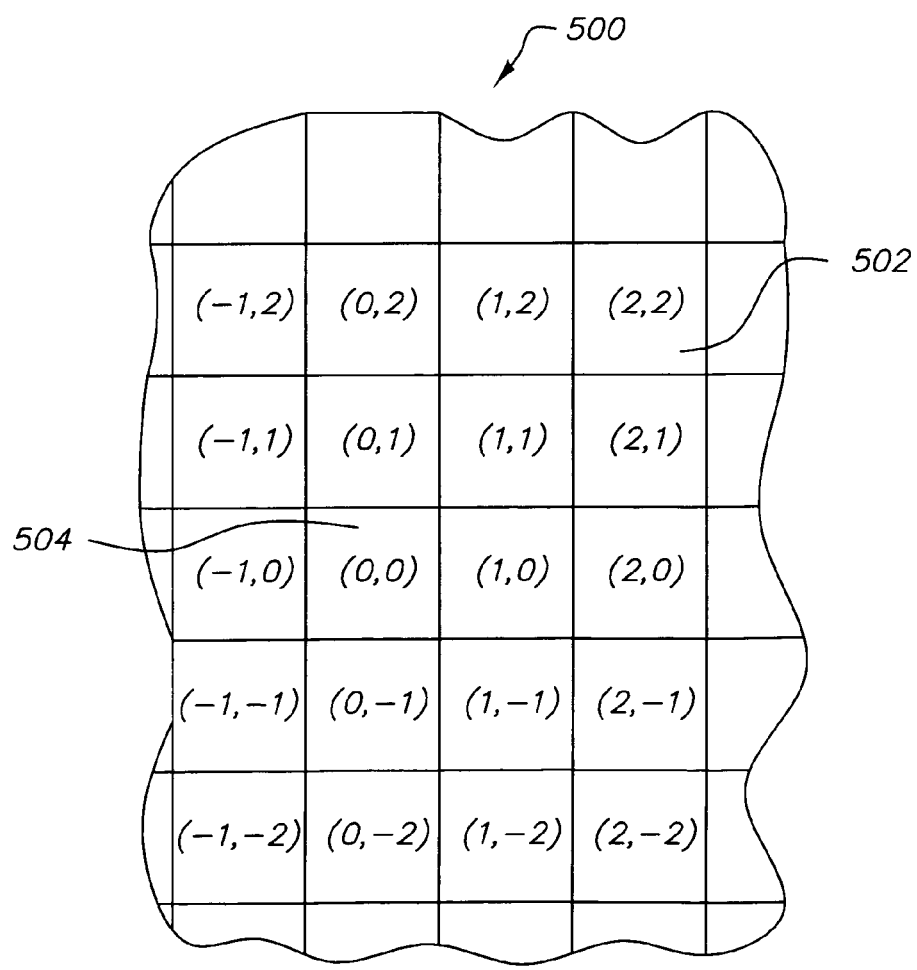
FIG. 5 presents a tabular diagram of the image data produced, by address of the corresponding imaging element, in accordance with one embodiment of the present invention.

FIG. 5 presents a tabular diagram of the image data produced by address (a,b) of the corresponding imaging element, in accordance with one embodiment of the present invention. The addresses 502 of the image data 500, derived from the output signal produced by the sensor in this embodiment, are shown with the origin 504 corresponding to the address (0,0). Each of the addresses corresponds to a single pixel of the image to be displayed, wherein the pixel address is the address of the imaging element. Due to the nonlinear distribution of sensing elements and the linear addressing, the sensing element described above provides output image data which is corrected for the distortion introduced by the perspective projection of the image onto the sensor without the need of complex mathematical transform circuitry.

Figure 6:
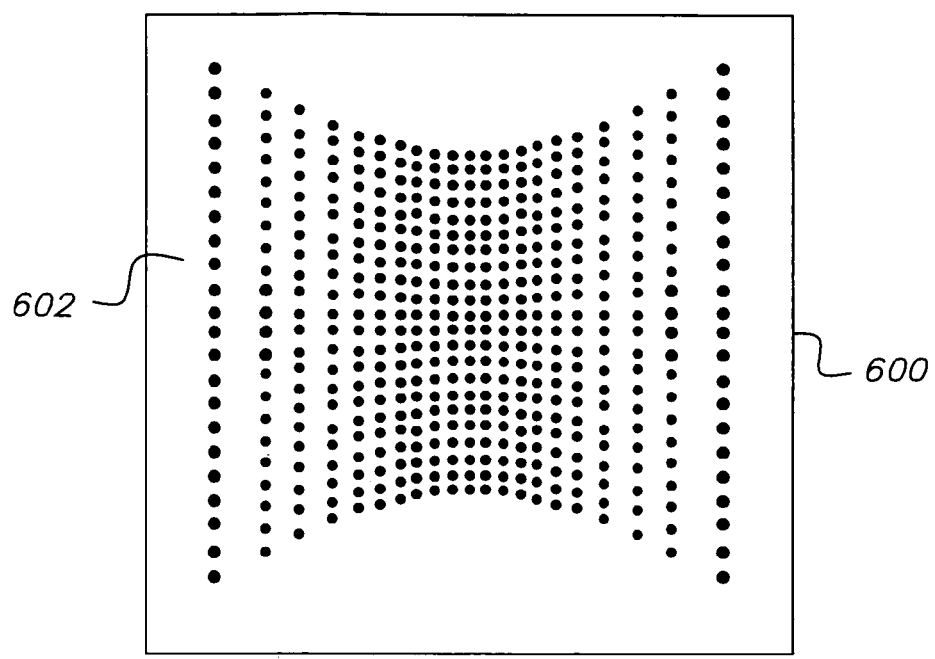
FIG. 6 is a top view of an imaging sensor in accordance with an embodiment of the present invention.

FIG. 6 is a top view of an imaging sensor in accordance with an embodiment of the present invention. Imaging sensor 600 includes an array of imaging elements 602 that is nonlinearly distributed. In particular, the nonlinear distribution of four-hundred and forty-one pixels in array 602 corresponds to an example of the sensor of the present invention where the physical coordinates of each imaging element correspond to the projection of the scene onto a cylindrical surface. The physical location of each sensor element can be described by the aforementioned formula:

$$\tilde{I}(x,y) = I(f\tan(xp_xf^{-1})/p_x, yf\tan(xp_xf^{-1})/xp_x), \text{ for } x \neq 0,$$
and $$\tilde{I}(0,y) = I(0,y),$$

where pixel (x, y) of the cylindrical image $\tilde{I}$ is related to a planar image I containing four-hundred and forty-one pixels in a uniform rectilinear array.

Figure 7:
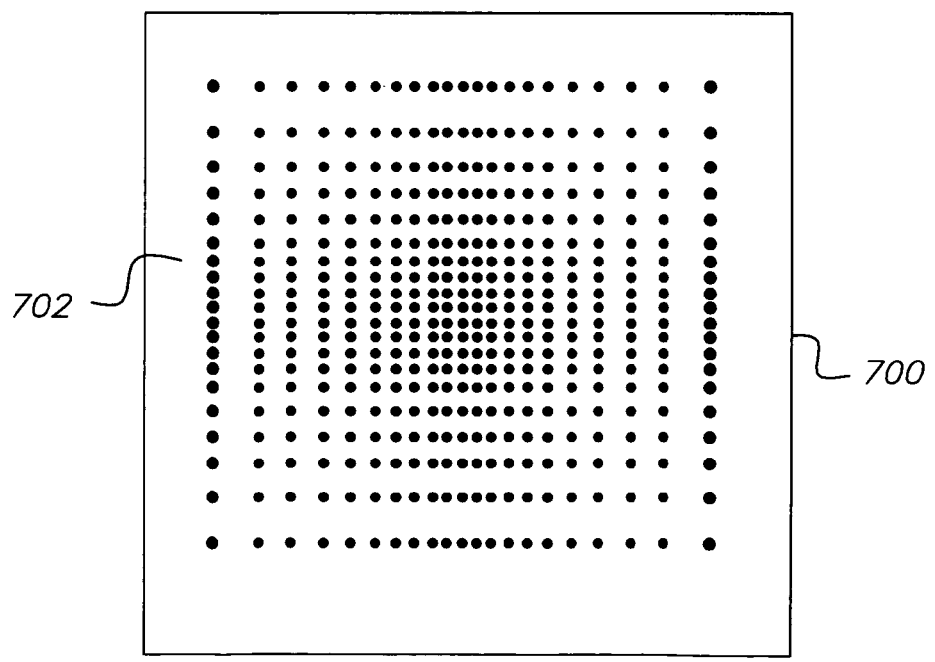
FIG. 7 is a top view of an imaging sensor in accordance with an alternative embodiment of the present invention.

FIG. 7 is a top view of an imaging sensor in accordance with an alternative embodiment of the present invention. Imaging sensor 700 includes an array of imaging elements 702 that is nonlinearly distributed. In particular, the nonlinear distribution of four-hundred and forty-one pixels in array 702 corresponds to an example of the sensor of the present invention where the physical coordinates of each imaging element correspond to the projection of the scene onto a spherical surface. The physical location of each sensor element can be described by the aforementioned formula:

$$\tilde{I}(x,y) = I(f\tan(xp_xf^{-1})/p_x, f\tan(yp_yf^{-1})/p_y),$$

where pixel (x,y) of the spherical image $\tilde{I}$ is related to a planar image I containing four-hundred and forty-one pixels in a uniform rectilinear array. As shown in both FIGS. 6 and 7, the imaging elements (602, 702) are distributed on the surface of the imaging sensor (600, 700) according to a distribution representable by a non-linear function in which the relative density of the distribution is greater toward the center of the sensor.

Figure 8:
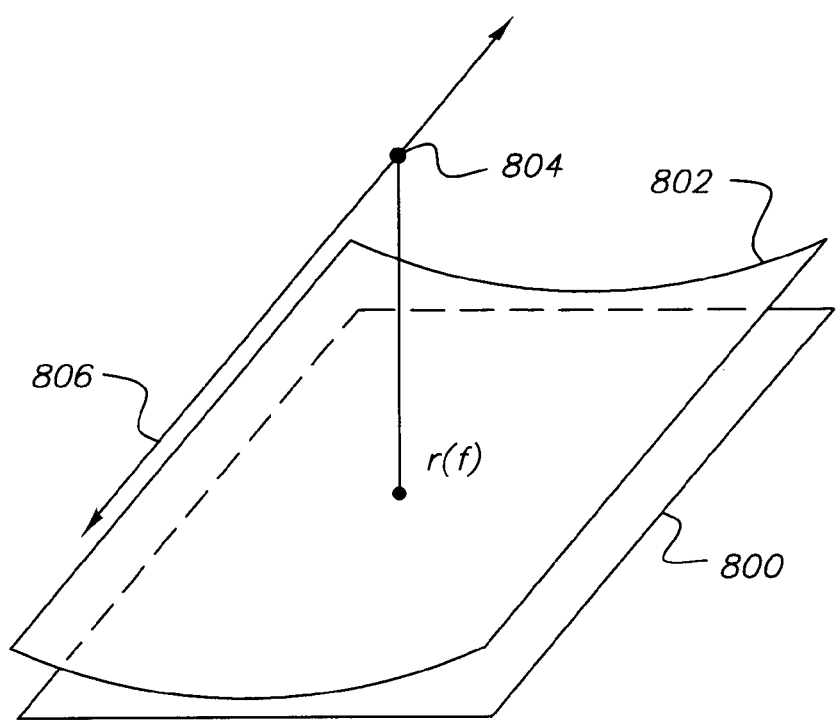
FIG. 8 shows a pictorial diagram of the geometric relationship between the image sensor and the nonplanar surface in accordance with one embodiment of the present invention.

FIG. 8 depicts a geometric representation of an imaging sensor 800, and corresponding cylindrical surface 802 onto which the image projection is simulated. In this embodiment, the nodal point 804 of the lens intersects the cylindrical axis 806. The radius r(f) of the cylinder is dependent on the focal length f. Preferably, r(f)=f.

Figure 9:
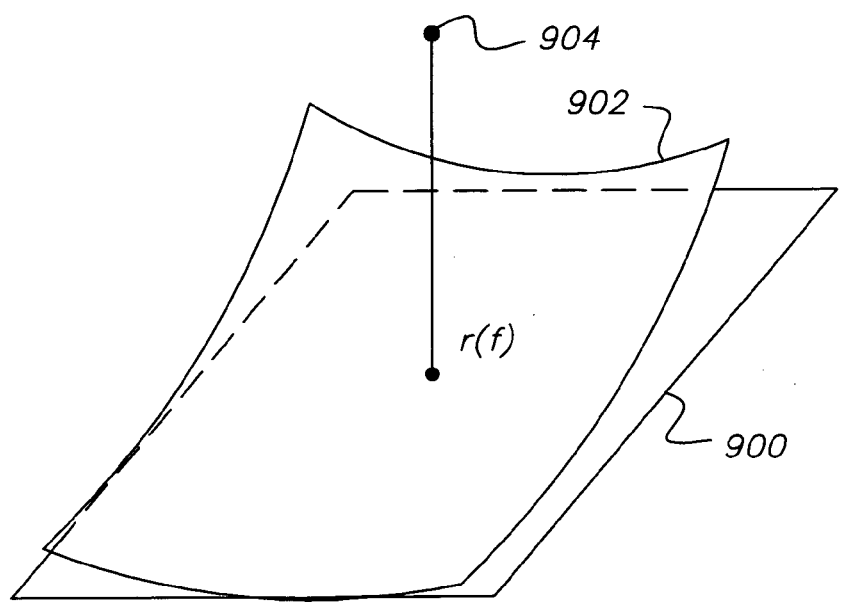
FIG. 9 shows a pictorial diagram of the geometric relationship between the image sensor and the nonplanar surface in accordance with an alternative embodiment of the present invention.

FIG. 9 depicts a geometric representation of an imaging sensor 900, and corresponding spherical surface 902 onto which the image projection is simulated. In this embodiment, the nodal point 904 of the lens is located at the center of the sphere. The radius r(f) of the sphere is dependent on the focal length f. Preferably, r(f)=f.

Figure 10:
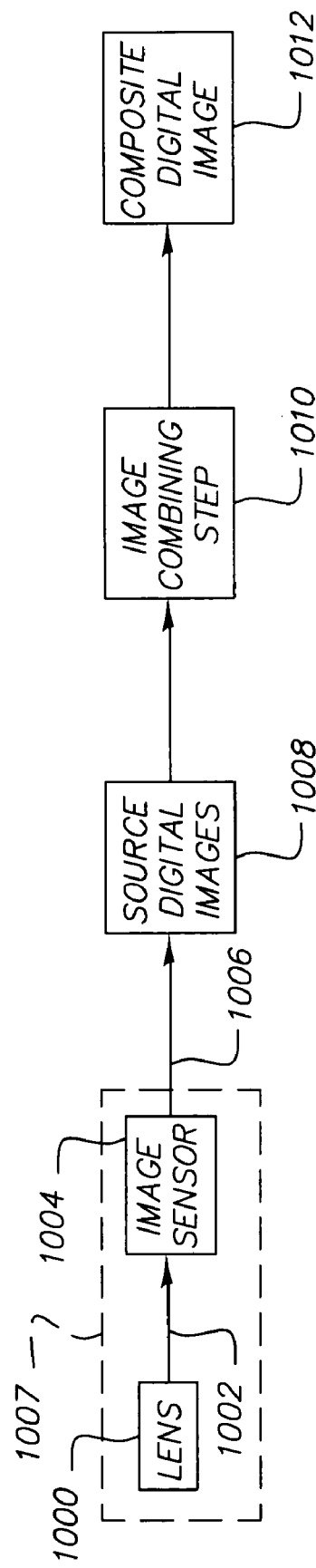
FIG. 10 presents a block diagram of an electronic imaging system in accordance with a further embodiment of the present invention.

FIG. 10 presents a block diagram of an electronic imaging system in accordance with a further embodiment of the present invention. The system includes a lens 1000 for producing an optical image 1002, and an image sensor 1004 having a surface in optical communication with the lens. This sensor 1004 converts the optical image 1002 into a corresponding output signal 1006. The imaging sensor 1004 includes a plurality of imaging elements, the plurality of imaging elements having a distribution on the surface representable by a nonlinear function, wherein the distribution of the imaging elements corrects for the distortion in the image 1002 induced by the projection of the optical image onto the planar sensor. Therefore, the output signal 1006 is free of perspective distortion. As shown in broken line, the preceding components may be included in a digital camera 1007.

At least two output signals are generated to form source digital images 1008. The source digital images are combined in an image combining step 1010 to form a composite digital image 1012. The image combining step 1010 typically includes an alignment step, where the source digital images 1008 are aligned either by estimating the alignment parameters with the image data (for example, by cross correlation or phase correlation), or by knowledge of the relative geometry of the camera system between subsequent captures. The image combining step 1010 also typically includes an image blending step, where the source digital images 1008 are blended together (for example, by taking weighted averages of pixel values in the overlap regions). Such a system for combining images is described in the aforementioned reference, H.-C. Huang and Y.-P. Hung, "Panoramic Stereo Imaging System with Automatic Disparity Warping and Seaming", Graphical Models and Image Processing, Vol. 60, No. 3, May, 1998, pp. 196–208.

Figure 11:
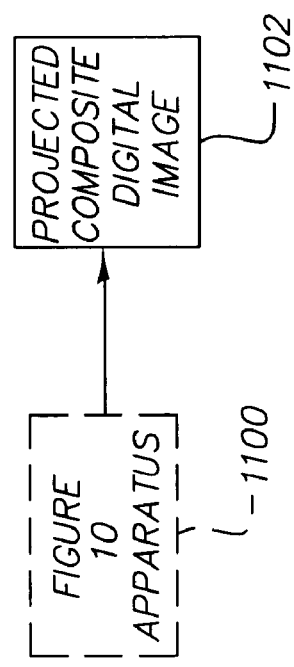
FIG. 11 presents a block diagram of an electronic imaging system in accordance with an alternative further embodiment of the present invention.

FIG. 11 presents a block diagram of an electronic imaging system in accordance with a further embodiment of the present invention. The electronic imaging system 1100, which is the system described in FIG. 10, generates the composite digital image 1012. The composite digital image is then projected onto a planar surface by techniques well known in the art to form a projected composite digital image 1102.

The invention has been described with reference to a preferred embodiment. However, it will be appreciated that variations and modifications can be effected by a person of ordinary skill in the art without departing from the scope of the invention.

PARTS LIST 100 camera
102 lens
104 imaging sensor
200 optical image
202 surface
204 imaging element
206 output line
300 chip body
302 circular array
304 elements
306 elements
308 elements
310 axis
400 rectangular array
402 image
500 image data
502 addresses
600 imaging sensor
602 array of imaging elements
700 imaging sensor
702 array of imaging elements
800 imaging sensor
802 cylindrical surface
804 nodal point
806 cylindrical axis
900 imaging sensor
902 spherical surface
904 nodal point
1000 lens
1002 optical image
1004 image sensor
1006 output signal
1007 digital camera
1008 source digital images
1010 image combining step
1012 composite digital image
1100 electronic imaging system
1102 projected composite digital image

What is claimed is:

1. An electronic imaging system for capturing an image of a scene, said imaging system comprising:
   (a) an optical system for producing an optical image of the scene;
   (b) an imaging sensor having a surface in optical communication with the optical system; and
   (c) a plurality of imaging elements distributed on the surface of the imaging sensor, said imaging elements converting the optical image into a corresponding output image, said imaging elements being located according to a distribution representable by a nonlinear function in which relative density of the distributed imaging elements is greater toward the center of the sensor, wherein the distribution provides physical coordinates for each of the imaging elements corresponding to a projection of the scene onto a non-Planar surface, wherein said output image has a plurality of pixels, each said pixel corresponding to a respective one of said imaging elements;
   wherein said optical system provides a perspective projection of said optical image onto said surface of said imaging sensor, wherein said optical image has a perspective distortion relative to said surface of said imaging sensor, said perspective distortion being inherent in geometry of said perspective projection onto said surface of said imaging sensor, and said distribution of said imaging elements on said surface of said imaging sensor compensates said output image for said perspective distortion, such that said output image is free of said perspective distortion and has said pixels in a uniform rectilinear array.

2. The system of claim 1 wherein the non-planar surface is a cylinder.

3. The system of claim 1 wherein the non-planar surface is a sphere.

4. The system of claim 2 wherein the optical system includes a lens and the axis of rotation of the cylinder intersects a nodal point of the lens.

5. The system of claim 3 wherein the optical system includes a lens and the center of the sphere is located at a nodal point of the lens.

6. The system of claim 2 wherein the radius of the cylinder is a function of a focal length of the optical system.

7. The system of claim 3 wherein the radius of the sphere is a function of a focal length of the optical system.

8. The system of claim 1 wherein the imaging sensor is a charge-coupled device.

9. The system of claim 1 wherein the imaging sensor is a CMOS device.

10. The system of claim 1 wherein the output image includes data from a plurality of images.

11. The system of claim 10 further including a processor for combining the images into a composite image, whereby the processor can operate directly on the output image without having to warp the image data.

12. The system of claim 11 further including a projector for projecting the composite image onto a planar surface.

13. A method of generating a composite digital image from at least two source digital images, said method comprising:
   providing a perspective projection of each of said source optical images onto a planar surface of an image sensor, wherein each of said source optical images has a perspective distortion relative to said surface, said perspective distortion being inherent in geometry of said perspective projection onto said surface, said image sensor having a plurality of imaging elements, said imaging elements being located according to a distribution representable by a nonlinear function in which relative density of the distributed imaging elements is greater toward the center of the sensor, wherein the distribution provides physical coordinates for each of the imaging elements corresponding to a projection of the scene onto a non-planar surface wherein said distribution of imaging elements on said surface compensates for said perspective distortion;

generating at least two source digital images corresponding to said optical images said source digital images each having a plurality of pixels, each said pixel corresponding to a respective one of said imaging elements, said pixels being in a uniform rectilinear array free of said distortion; and combining the source digital images without further correction of said perspective distortion to form a composite digital image.

14. The method of claim 13 further comprising the step of projecting the composite digital image.

15. The method of claim 13 wherein the two source digital images overlap in overlapping pixel regions.

16. The method of claim 13 wherein said perspective distortion corresponds to a projection of the scene onto a cylinder.

17. The method of claim 13 wherein said perspective distortion corresponds to a projection of the scene onto a sphere.

18. A method of generating a composite digital image, said method comprising:

projecting an optical image of a scene on an image sensor having a planar surface, said optical image having a perspective distortion relative to said planar surface, said perspective distortion being inherent in geometry of said projecting on said planar surface, said image sensor having a plurality of imaging elements, said imaging elements being located according to a distribution representable by a nonlinear function in which relative density of the distributed imaging elements is greater toward the center of the sensor, wherein the distribution provides physical coordinates for each of the imaging elements corresponding to a projection of the scene onto a non-planar surface, wherein said distribution of imaging elements on said surface compensatory compensates for said perspective distortion; and generating a digital image corresponding to said optical image using said image sensor said digital image having a plurality of pixels, each said pixel corresponding to a respective one of said imaging elements, said pixels being in a uniform rectilinear array free of said perspective distortion.

19. The method of claim 18 wherein said imaging elements are linearly addressed.

20. A method of generating a composite digital image, said method comprising:

receiving a perspective projection of a scene onto a plurality of imaging elements defining a plane, said projection having a perspective distortion relative to said plane, said perspective distortion being inherent in geometry of said projection, said imaging elements being located in said plane according to a non-linear distribution wherein relative density of the distributed imaging elements is greater toward the center of the sensor, wherein the distribution provides physical coordinates for each of the imaging elements corresponding to a projection of the scene onto a non-planar surface, and wherein said distribution being compensatory of said perspective distortion; and generating a digital image corresponding to said optical image using said imaging elements without further correction of said perspective distortion, said digital image having a plurality of pixels, each said pixel corresponding to a respective one of said imaging elements, said pixels being in a uniform rectilinear array free of said perspective distortion.

21. The method of claim 20 further including combining said digital image and one or more additional digital images into a composite image without warping.

* * * * *